US010928512B2

(12) United States Patent
Högasten (10) Patent No.: US 10,928,512 B2
(45) Date of Patent: Feb. 23, 2021

(54) VEHICLE BASED RADAR UPSAMPLING (71) Applicant: FLIR Systems, Inc., Wilsonville, OR (US)

(72) Inventor: Nicholas Högasten, Santa Barbara, CA (US)

(73) Assignee: FLIR Systems, Inc., Wilsonville, OR (US)

(*) Notice: Subject to any disclaimer, the term of this patent is extended or adjusted under 35 U.S.C. 154(b) by 234 days.

(21) Appl. No.: 16/007,908

(22) Filed: Jun. 13, 2018

(65) Prior Publication Data
US 2018/0292529 A1 Oct. 11, 2018

Related U.S. Application Data (63) Continuation of application No. PCT/US2017/012609, filed on Jan. 6, 2017.
(Continued)

(51) Int. Cl.
G01S 13/931 (2020.01)
G01S 17/89 (2020.01)
(Continued)

(52) U.S. Cl.
CPC .......... G01S 13/931 (2013.01); G01S 13/867 (2013.01); G01S 13/89 (2013.01); G01S 17/86 (2020.01); G01S 17/89 (2013.01); G01S 17/931 (2020.01); G06K 9/00201 (2013.01); G06K 9/00805 (2013.01); G06K 9/6268 (2013.01); G06K 9/6288 (2013.01); G01J 5/0025 (2013.01); G01S 2013/9323 (2020.01); G01S 2013/93271 (2020.01); G01S 2013/93272 (2020.01); G01S 2013/93274 (2020.01); G06K 9/00362 (2013.01); G06K 9/00791 (2013.01); H04N 5/33 (2013.01)

(58) Field of Classification Search
CPC ...... G01S 13/931; G01S 17/86; G01S 17/931; G01S 17/89; G01S 13/867; G01S 13/89; G01S 2013/9323; G01S 2013/93271; G01S 2013/93272; G01S 2013/93274; G06K 9/00201; G06K 9/00805; G06K 9/6268; G06K 9/6288; G06K 9/00362; G06K 9/00791; G01J 5/0025; H04N 5/33
USPC ........................................... 342/53
See application file for complete search history.

(56) References Cited

U.S. PATENT DOCUMENTS

2003/0179084 A1* 9/2003 Skrbina ............... G01S 13/867
340/435

FOREIGN PATENT DOCUMENTS

DE 102013221713 12/2014
EP 0913751 5/1999

OTHER PUBLICATIONS

Grover et al., "A Low-Level Fusion of Millimetre-Wave Radar and Nightvision Imaging for Enhanced Characterisation of a Cluttered Environment," Proceedings 2001 Australian Conference on Robotics and Automation, Nov. 14-15, 2001, pp. 98-103, Sydney.

* cited by examiner

Primary Examiner — Bo Fan
(74) Attorney, Agent, or Firm — Haynes and Boone, LLP (57) ABSTRACT Various embodiments of the present disclosure may include one or more object detection devices. The object detection devices may include at least one distance sensor such as a radar, lidar, or other distance sensor and at least one thermal sensor such as a thermal imaging device. One or more object detection devices may be mounted to vehicles to provide enhanced representations of an area around the vehicles.

20 Claims, 5 Drawing Sheets

Related U.S. Application Data (60) Provisional application No. 62/277,186, filed on Jan. 11, 2016.

(51) Int. Cl.
*G01S 13/86* (2006.01)
*G01S 13/89* (2006.01)
*G06K 9/00* (2006.01)
*G01S 17/86* (2020.01)
*G01S 17/931* (2020.01)
*G06K 9/62* (2006.01)
*G01J 5/00* (2006.01)
*H04N 5/33* (2006.01)

VEHICLE BASED RADAR UPSAMPLING

CROSS-REFERENCE TO RELATED APPLICATIONS

This application is a continuation of International Patent Application No. PCT/US2017/012609 filed Jan. 6, 2017 and entitled "VEHICLE BASED RADAR UPSAMPLING," which is incorporated herein by reference in its entirety.

International Patent Application No. PCT/US2017/012609 claims priority to and the benefit of U.S. Provisional Patent Application No. 62/277,186 filed Jan. 11, 2016 and entitled "VEHICLE BASED RADAR UPSAMPLING," which is incorporated herein by reference in its entirety.

TECHNICAL FIELD

One or more embodiments of the invention relate generally to vehicle control devices and more particularly to, for example, vehicle object detection devices.

BACKGROUND

The ability for a vehicle to quickly and accurately determine an environment around the vehicle or display a representation of the environment to an operator of the vehicle is desirable. Such an ability may be particularly desirable as autonomous vehicle technology becomes more common. Traditional systems for determining the environment around the vehicle may be expensive and inaccurate.

SUMMARY

Systems and methods are disclosed herein for providing vehicle based radar upsampling. In certain embodiments, an apparatus may be provided. The apparatus may include an object detection device and a logic device. The object detection device may include a first distance sensor configured to detect objects within a first distance area and output first distance data and a first thermal sensor configured to detect thermal signatures within a first thermal area and output first thermal data. The first distance area and the first thermal area may at least partially overlap. The logic device may be configured to receive the first distance data, receive the first thermal data, and generate, based, at least in part, on the first distance data and the first thermal data, a three-dimensional representation of a first overlapping area comprising the overlap of the first distance area and the first thermal area.

In an additional embodiment, a method may be provided. The method may include receiving first distance data from a first distance sensor of an object detection device, where the first distance sensor is configured to detect objects within a first distance area, receiving first thermal data from a first thermal sensor of the object detection device, where the first thermal data is configured to detect thermal signatures within a first thermal area, and generating, based, at least in part, on the first distance data and the first thermal data, a three-dimensional representation of a first overlapping area comprising the overlap of the first distance area and the first thermal area.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Techniques and mechanisms are provided in accordance with one or more embodiments to image an environment around a vehicle, detect one or more objects around the vehicle, and/or identify and/or classify the objects around the vehicle. The vehicle may be any vehicle such as, for example, an aircraft, an automotive, a locomotive or train, a watercraft, a motorcycle, a hovercraft, a spacecraft, or another type of vehicle.

Certain embodiments may include one or more object detection devices. The object detection devices may include at least one distance sensor and at least one thermal sensor. The distance sensor and the thermal sensor of the object detection device may include overlapping fields of view. An area or volume may be imaged by the distance and thermal sensors. Data from the distance and/or thermal sensor may be used detect one or more objects within, at least, the field of view. The one or more objects detected may then be classified with data from the thermal sensor.

Figure 1:
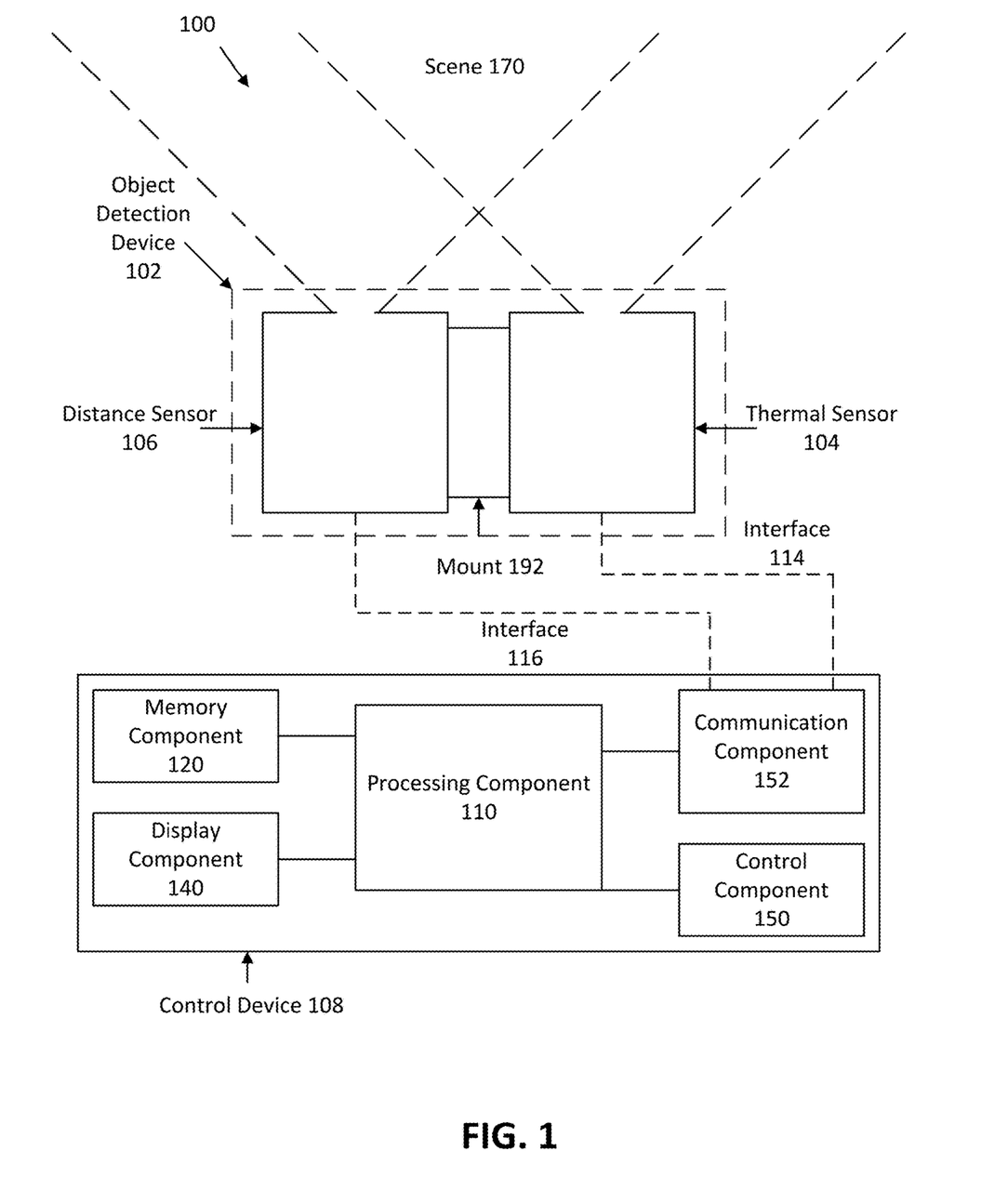
FIG. 1 illustrates a block diagram of an object detection system in accordance with an embodiment of the disclosure.

FIG. 1 illustrates a block diagram of an object detection system in accordance with an embodiment of the disclosure. Object detection system 100 in FIG. 1 may be used to capture and process data and images of an environment in accordance with various techniques described herein. FIG. 1 illustrates an object detection system 100 with an object detection device 102 communicatively connected to a control device 108. The object detection device 102 includes a distance sensor 106 and a thermal sensor 104. The distance sensor 106 and the thermal sensor 104 may be coupled by a mount 192. The mount 192 may couple the distance sensor 106 and the thermal sensor 104 in a fixed spatial relationship. The mount 192 may be a rigid structure and may be used to control the distance between the distance sensor 106 and the thermal sensor 104. The distance sensor 106 may be, for example, radar, lidar, a range finder, or another sensor that may provide spatial awareness (e.g., detect one or more objects located at a distance from the distance sensor 106 and/or determine the distance that the one or more objects are located at relative to the distance sensor 106). The thermal sensor 104 may be, for example, a thermal imaging camera such as a bolometer based camera or any other appropriate camera. Other embodiments of the object detection device 102 may include other combinations of sensors, such as two or more distance sensors and/or two or more thermal sensors.

In certain embodiments, the distance sensor 106 and the thermal sensor 104 may be synchronized. That is, the distance sensor 106 and thermal sensor 104 may be calibrated to acquire images of and/or data associated with a scene 170. Accordingly, at least a portion of the scene 170 imaged by the distance sensor 106 may also be imaged by the thermal sensor 104. The thermal sensor 104 and the distance sensor 106 may acquire data (e.g., images, video, distance data, and/or other data) simultaneously or substantially simultaneously (e.g., during the same period). The data from the distance sensor 106 and the thermal sensor 104 may then be outputted to the control device 108 for processing via, for example, interfaces 116 and 114, respectively.

Object detection system 100 may include components distributed over multiple devices. In particular, the object detection device 102 may be in communication with the control device 108. Other embodiments may distribute the components to devices in other ways and may, in addition, distribute the components to three or more devices. Some such embodiments may distribute one, some, or all of the components of the object detection system 100 over the cloud. In the embodiment in FIG. 1, the interfaces 116 and 114 may communicatively connect the distance sensor 106 and the thermal sensor 104, respectively, to a communication component 152 of the control device 108. In various embodiments, the interfaces 116 and 114 may be a Bluetooth link, a WiFi link, a NFC link, a wired connection, or another type of link between the sensors 106 and 104 and the control device 108.

In certain embodiments, the control device 108 may include a processing component 110, a memory component 120, a display component 140, a second communication component 152, and a control component 150. The processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. The processing component 110 may be adapted to interface and communicate with components 120, 140, 150, and 152.

The processing component 110 (via the interfaces 116 and 114) may be adapted to data from the object detection device 102, process such data, store signals or data in the memory component 120, and/or retrieve stored signals or data from the memory component 120. Processing component 110 may be adapted to output data to the display component 140 for viewing by a user.

Display component 140 may include, in one embodiment, an image display device (e.g., a liquid crystal display (LCD)) or various other types of generally known video displays or monitors. Processing component 110 may be adapted to display data and information on display component 140.

In various aspects, display component 140 may be remotely positioned (e.g., housed in a separate housing) and processing component 110 may be adapted to remotely display data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Processing component 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of an integrated display within a vehicle (such as a LED or LCD display), a multi-functional display, a smart phone, a tablet, a personal digital assistant (e.g., a wireless, mobile device), a laptop computer, a desktop computer, or other type of device.

In various embodiments, various components of the object detection system 100 may be combined and/or implemented or not, as desired or depending on application requirements. For example, processing component 110 may be combined with memory component 120, control component 150, display component 140, and/or communication component 152.

Figure 2:
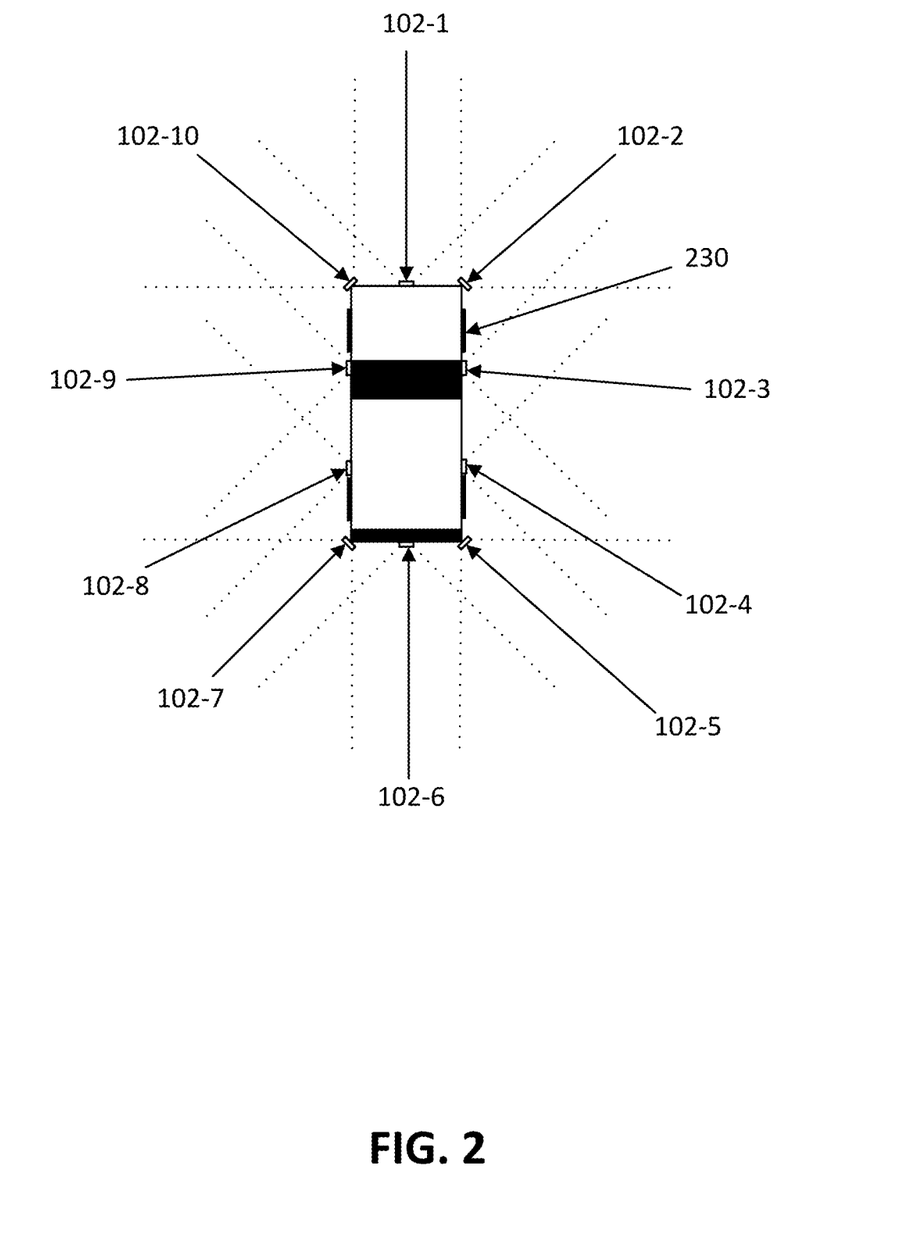
FIG. 2 illustrates a vehicle equipped with an array of object detection devices in accordance with an embodiment of the disclosure.

FIG. 2 illustrates a vehicle equipped with an array of object detection devices in accordance with an embodiment of the disclosure. FIG. 2 includes a vehicle 230 with a plurality of object detection devices 102-1-10 disposed at various positions of the vehicle 230. The vehicle 230 may be any vehicle such as, for example, an aircraft, an automotive, a locomotive or train, a watercraft, a motorcycle, a hovercraft, a spacecraft, or another type of vehicle.

The object detection devices 102-1-10 may be disposed on the outside of the vehicle 230, but other embodiments may dispose the object detection devices within the vehicle 230 or within certain housings on the vehicle 230. In certain embodiments where the object detection devices are mounted on an automobile, the object detection devices may, for example, be disposed of on the front, back, sides, roof, hood, trunk, windows, mirrors, and other portions of the vehicle 230. The object detection devices 102-1-10 may be arranged in a manner to allow for a full 360 degree coverage of the area around the vehicle. In certain other embodiments, the object detection devices may be arranged to cover areas of interest around the vehicle 230 (e.g., an area forward of the vehicle 230, an area backward of the vehicle 230, blindspots of the vehicle 230, and/or areas to the sides of the vehicle 230). As such, the object detection devices may detect the presence of objects around the vehicle 230 and classify such objects. The detection and classification of objects may aid an operator or a navigational system (e.g., of an autonomous or partially autonomous control system of the vehicle 230 such as adaptive cruise control, autopilot, or full autonomous piloting) in the operation of the vehicle 230. The object detection devices 102-1-10 may output data to a control device 108 located within the vehicle 230, external to the vehicle 230, or distributed both internal and external to the vehicle 230.

Figure 3:
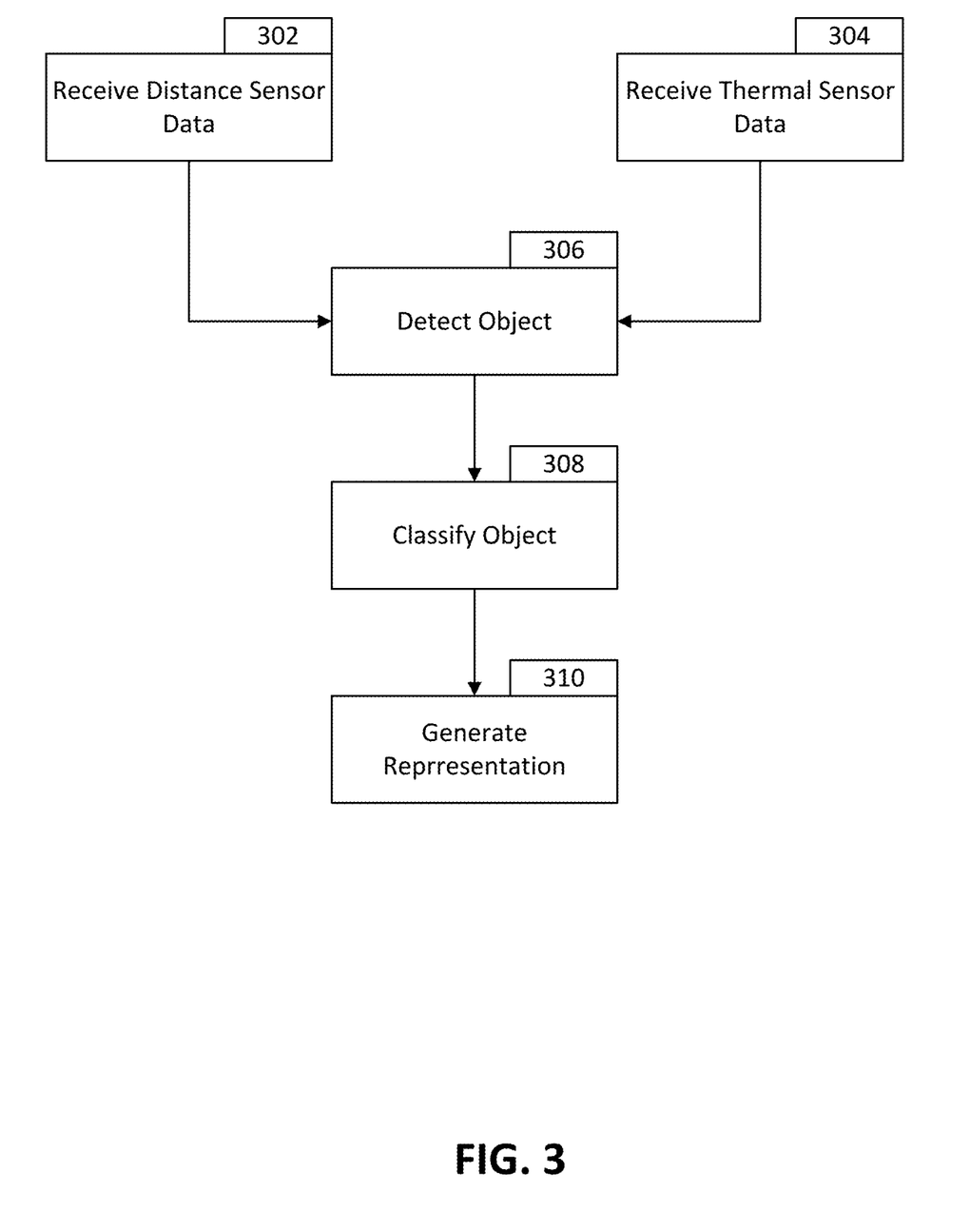
FIG. 3 illustrates a flowchart of an object classification technique performed with an object detection system in accordance with an embodiment of the disclosure.

FIG. 3 illustrates a flowchart of an object classification technique performed with an object detection system in accordance with an embodiment of the disclosure. In block 302, one or more distance sensors may image or sense an area. In certain embodiments, such as embodiments where one or more distance sensors are radar sensors, the distance sensor data may be two-dimensional (2D) or three-dimensional (3D) radar data. In block 304, one or more thermal sensors may detect thermal signatures within the area. Data from the one or more distance sensors and the one or more thermal sensors may then be outputted to a control device.

In block 306, objects within the area may be detected. The objects may be detected from, for example, the distance sensor data and/or the thermal sensor data. In certain embodiments, such as embodiments where one or more distance sensors may be radar sensors, the control device may, from data outputted by the one or more distance sensors, detect objects within the area (e.g., may detect objects through the reflection of radar signals from the radar sensor). Additionally, the control device may also determine that the objects are at a certain distance and/or within a certain plane located at a certain distance. In certain such embodiments, the control device may compensate for the Doppler effect when distances are determined while the vehicle is moving.

In certain other embodiments, the control device may detect objects with data from, at least, the one or more thermal sensors by, for example, detecting objects via thermal signature. For example, certain objects, such as humans, animals, or vehicles, may be significantly warmer than the surrounding environment and thus may emit a thermal signature that is significantly warmer than the environment. The control device may detect such thermal signatures and determine the presence of objects from the signatures.

After the object has been detected, it may be classified in block 308. Classification may be performed using, for example, the distance sensor data and/or the thermal sensor data. Distance sensor data may be used to, for example, determine a shape of the object and classify the object, at least partially, due to the size and/or shape of the object. Additionally or alternatively, thermal sensor data may be used to, for example, determine a temperature of the object and classify the object, at least partially, due to the temperature of the object. For example, a certain animal may be known to have a body temperature of X while another animal may be known to have a body temperature of Y. Thus, if a detected object about the size of both animals has a body temperature of Y, it may be classified to be animal Y. The techniques may additionally be combined, such that if an object is a certain size, only known temperatures for objects of such sizes may be referred to for determining the classification of the object.

In block 310, a representation of the environment, that may include the objects detected, may be generated. The representation may, in certain embodiments, be used by the vehicle for piloting (e.g., autopilot, adaptive cruise control, and/or autonomous piloting) purposes. Other embodiments, may output the representation onto, for example, a display component for communication to an operator of the vehicle.

The representation may be generated from data from the one or more distance sensors and/or data from the one or more thermal sensors. In certain embodiments, objects detected and classified in blocks 306 and 308 may be displayed and/or highlighted within the representation. Additionally, in certain embodiments, data from the one or more distance sensors and/or the one or more thermal sensors may be used as part of an interpolation, warping, and/or upsampling process. Such processes may be performed to, for example, sharpen terrain, objects, and other features within the representation. A function may be utilized for such processes in order to interpolate, warp, and/or upsample data from the distance sensor, the thermal sensor, or from another sensor such as a visual sensor. Such functions may, in certain embodiments, be determined, at least in part, responsive to data from the one or more distance sensors or data from the one or more thermal sensors. In such embodiments, the higher resolution signal of the distance sensor or the thermal sensor may be used to improve resampling and/or upsampling of the lower resolution signal of the distance sensor or the thermal sensor for any two-dimensional or three-dimensional representations.

For example, in such embodiments, the distance sensor data may be lower resolution than the thermal sensor data (or vice versa). The data with the lower resolution (e.g., the distance sensor data in the above example) may be resampled (e.g., upsampled) to match the resolution of the data with the higher resolution. In such embodiments, the higher resolution data may be used to guide the resampling of the lower resolution data to more accurately depict terrain, objects, and/or other features in the representation. As such, the higher resolution data may guide the determination of the function for such resampling. Such interpolation, warping, upsampling, and/or resampling may be performed by, for example, systems and techniques described in U.S. Provisional Application No. 62/276,800, entitled "Systems and Methods for Image Resolution Enhancement" which is herein incorporated by reference in its entirety.

In certain embodiments, the technique illustrated in FIG. 3 may be performed in different orders. Additionally, the technique may be performed with few or additional steps. For example, certain embodiments may omit blocks 306 and 308, or block 310 may be performed before blocks 306 and 308.

Figure 4A:
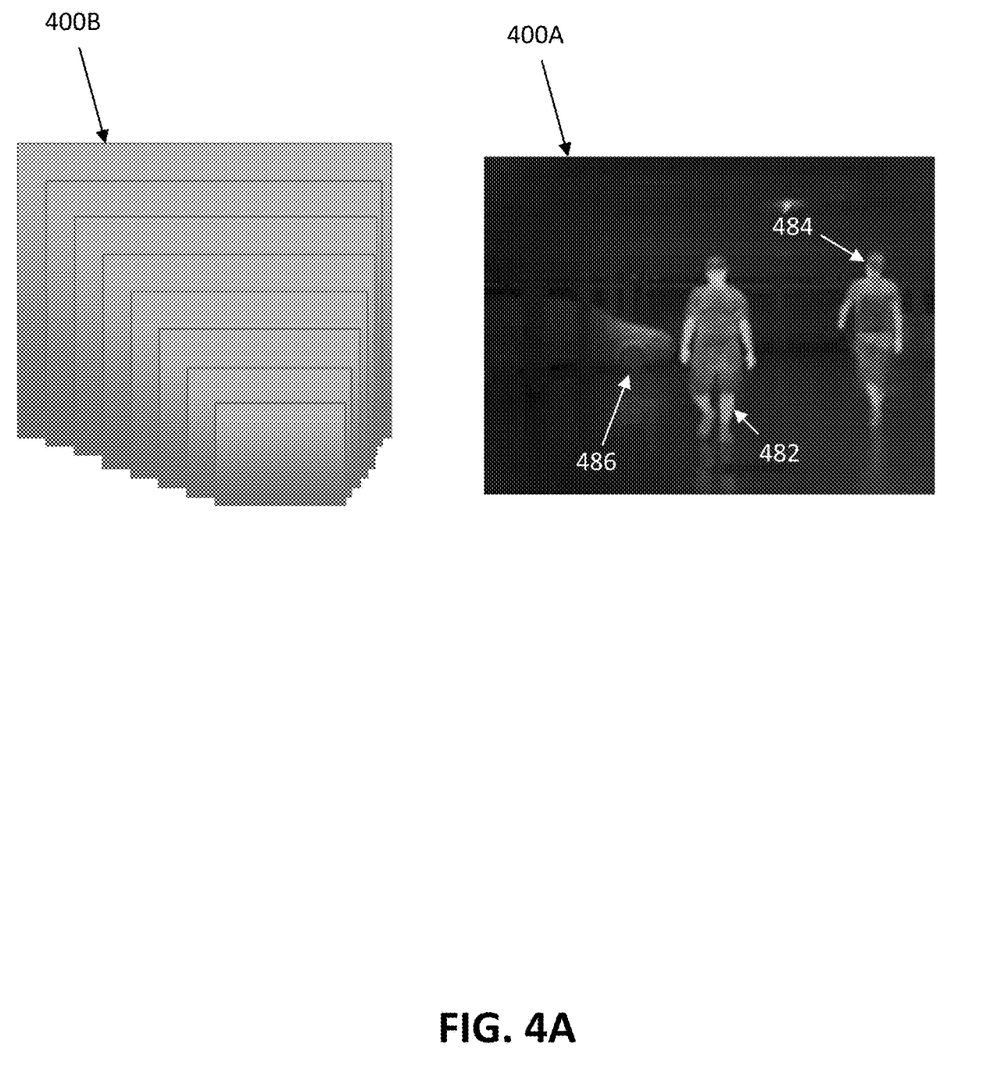
FIG. 4A illustrates an image with objects captured by an object detection device in accordance with an embodiment of the disclosure.

FIG. 4A illustrates an image with objects captured by an object detection device in accordance with an embodiment of the disclosure. FIG. 4A illustrates a thermal representation 400A of an area captured by a thermal sensor and sparse planes 400B of a distance sensor. The distance sensor may be, for example, a radar sensor and the sparse planes may represent, for example, various planes of detection of the distance sensor.

The thermal representation 400A may be a representation of the area by a single planar view (e.g., a two-dimensional representation). The thermal representation 400A may include representations (e.g., thermal readings or images) of persons 482 and 484 and vehicle 486.

Sparse planes 400B may be representations of the area detected by the distance sensor. The distance sensor may detect objects located at different distances and may also determine the distances that the objects are located at. As such, the distance sensor may generate a three-dimensional (and in some cases, "four-dimensional" due to compensation for any Doppler effect) representation of the area via, for example, the sparse planes 400B. The distance sensor may, in certain embodiments such as embodiments where the distance sensor is a radar sensor, image, scan, and/or emit signals directed towards a line or plane within the area. For example, in 3D radar embodiments, the distance sensor may image, scan, and/or emit signals directed towards one or more sparse planes and may cycle through imaging, scanning, and/or emitting signals directed towards a plurality of sparse planes where the sparse planes are located at different distances from the distance sensor. Accordingly, the sparse planes 400B may represent the plurality of different sparse planes imaged, scanned, and/or detected via emitted signals by the distance sensor. One or some of the spare planes 400B may include data detecting the persons 482 and/or 484 and/or the vehicle 486 within the sparse planes 400B.

Figure 4B:
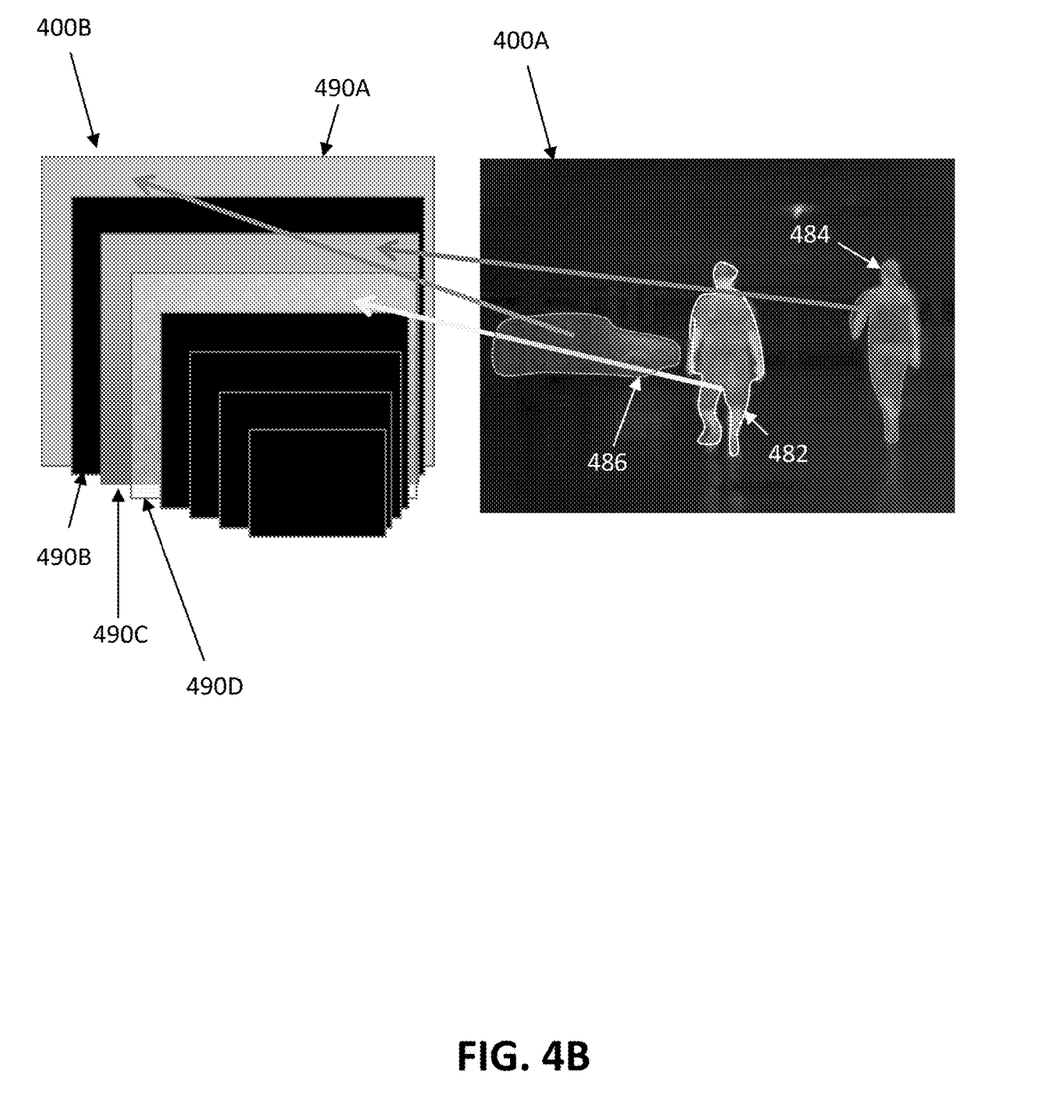
FIG. 4B illustrates an image with objects classified by an object detection device in accordance with an embodiment of the disclosure.

FIG. 4B illustrates an image with objects classified by an object detection device in accordance with an embodiment of the disclosure. In FIG. 4B, the sparse planes 400B may include a first sparse plane 490A, a second sparse plane 490B, a third sparse plane 490C, a fourth sparse plane 490D, and other sparse planes. A control device of the vehicle may classify the objects within the thermal representation 400A based, at least in part, on data from the distance sensor. For example, the control device may determine that the distance sensor has detected a first object within the first sparse plane 490A, a second object within the third sparse plane 490C, and a third object within the fourth sparse plane 490D. The control device may then determine that the person 482 may be detected within the fourth sparse plane 490D, the person 484 may be detected within the third sparse plane 490C, and the vehicle 486 may be detected within the first sparse plane 490A. Accordingly, the control device may then determine the distances that the persons 482 and 484 and the vehicle 486 are located at relative to the object detection device and/or the vehicle that the object detection device is coupled to.

The control device may determine which of the sparse planes the objects (e.g., person 482 and/or 484 and/or the vehicle 486) are located within by, for example, matching a size of the thermal reading and/or image with the size of an object detected within a sparse plane and/or matching a position of the object within the two-dimensional thermal representation 400A with the position of an object within a sparse plane. As such, in certain embodiments, an enhanced thermal representation with distance data and/or a three dimensional thermal representation may be generated.

In certain embodiments, the classification and/or matching of the objects may be performed according to an order. For example, in one embodiment, the closest and/or nearest object detected by the distance sensor may be matched to a thermal reading or thermal image detected by the thermal sensor in the same cone angle as that of the object detected within sparse plane (e.g., if a straight line is drawn from the object detection device to the object, the angle of the straight line would be the same or substantially similar within the distance sensor and the thermal sensor). The second closest and/or nearest object detected may then be matched to a second thermal reading or thermal image in the corresponding same cone angle as the second object. Such a process may be repeated for each object detected until all objects have been matched.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100A may be associated with a particular network link such as for example a URL (Uniform Resource Locator), an IP (Internet Protocol) address, and/or a mobile phone number.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
   an object detection device comprising:
      a first distance sensor configured to detect objects within at least a first part of a scene and determine object distances which are distances to the objects, and output first distance data, and
      a first thermal sensor configured to detect objects in at least the first part of the scene and output first thermal data; and
   a logic device configured to:
      receive the first distance data,
      receive the first thermal data,
      for each object detected by the first distance sensor, in an increasing order of object distances, match the object to the first thermal data to determine a distance to a matching object in the first thermal data; and
      generate, based, at least in part, on the distances to matching objects in the first thermal data, a three-dimensional representation of at least the first part of the scene.

2. The apparatus of claim 1, wherein the logic device is configured to generate the three-dimensional representation by, at least, interpolating, warping, and/or upsampling, with a function, one of the first distance data or the first thermal data, wherein the function is determined, at least in part, with the other of the first distance data or the first thermal data.

3. The apparatus of claim 1, wherein the logic device is further configured to:
   classify the objects with the first thermal data.

4. The apparatus of claim 1, wherein:
the first distance sensor is configured to cycle through a plurality of planes defined with respect to the first distance sensor as being at respective different distances from the first distance sensor, wherein cycling through the plurality of planes comprises emitting signals directed towards the planes; and
the three-dimensional representation associates each object detected in the first thermal data with one of the planes to indicate the distance to the object in the first thermal data.

5. The apparatus of claim 3, wherein:
the object detection device further comprises a second thermal sensor configured to detect thermal signatures within a second part of the scene and output second thermal data, wherein the first and second parts of the scene at least partially overlap; and
the logic device is further configured to:
receive the second thermal data, and
determine, based on the first thermal data and the second thermal data, a first object distance.

6. The apparatus of claim 1, wherein the object detection device is a first object detection device and further comprising:
a second objection detection device comprising:
a second distance sensor configured to detect objects within a second part of the scene and output second distance data, and
a second thermal sensor configured to detect thermal signatures within the second part of the scene and output second thermal data, wherein the first and second parts of the scene at least partially overlap and the logic device is further configured to:
receive the second distance data;
receive the second thermal data, wherein the three-dimensional representation is generated based, additionally, on the second distance data and the second thermal data, wherein the three-dimensional representation further comprises a representation of a scene portion comprising the overlap of the first and second parts of the scene.

7. The apparatus of claim 1, wherein the first distance sensor is a radar based sensor and/or a lidar based sensor.

8. The apparatus of claim 1, where the logic device is further configured to output the three-dimensional representation to a user interface.

9. The apparatus of claim 1, further comprising a mobile structure, wherein the object detection device is coupled to the mobile structure.

10. The apparatus of claim 9, wherein the mobile structure comprises a plurality of object detection devices such that each object detection device comprises a distance sensor and a thermal sensor.

11. The apparatus of claim 10, wherein the plurality of object detection devices are coupled to the mobile structure to provide a 360 degree coverage around the mobile structure and the three-dimensional representation generated by the logic device comprises at least a representation of the 360 degree coverage around the mobile structure.

12. A method comprising:
receiving first distance data from a first distance sensor of an object detection device, wherein the first distance sensor is configured to detect objects within at least a first part of a scene;
receiving first thermal data from a first thermal sensor of the object detection device, wherein the first thermal data is configured to detect objects in at least the first part of the scene;
for each object detected by the first distance sensor, in an increasing order of object distances, matching the object to the first thermal data to determine a distance to a matching object in the first thermal data; and
generating, based, at least in part, on the distances to matching objects in the first thermal data, a three-dimensional representation of at least the first part of the scene.

13. The method of claim 12, further comprising:
classifying the objects with the first thermal data.

14. The method of claim 13, further comprising:
cycling, with the first distance sensor, through a plurality of planes defined with respect to the first distance sensor as being at respective different distances from the first distance sensor, wherein cycling through the plurality of planes comprises emitting signals directed towards the planes;
wherein the three-dimensional representation associates each object detected in the first thermal data with one of the planes to indicate the distance to the object in the first thermal data.

15. The method of claim 13, further comprising:
receiving second thermal data from a second thermal sensor of the object detection device, wherein the second thermal data is configured to detect thermal signatures within a second part of the scene, wherein the first and second parts of the scene at least partially overlap; and
determining, based on the first thermal data and the second thermal data, a first object distance.

16. The method of claim 12, further comprising:
receiving second distance data from a second distance sensor, wherein the second distance sensor is configured to detect objects within a second part of the scene;
receiving second thermal data from a second thermal sensor, wherein the second thermal data is configured to detect thermal signatures within the second part of the scene, wherein the three-dimensional representation is generated based, additionally, on the second distance data and the second thermal data, and wherein the three-dimensional representation further comprises a representation of a scene portion comprising the overlap of the first and second parts of the scene; and
outputting the three-dimensional representation to a user interface.

17. The method of claim 12, wherein the first distance sensor is a radar based sensor and/or a lidar based sensor.

18. The method of claim 12, wherein the object detection device is coupled to a mobile structure.

19. The method of claim 18, wherein the mobile structure comprises a plurality of object detection devices such that each object detection device comprises a distance sensor and a thermal sensor.

20. The method of claim 19, wherein the plurality of object detection devices are coupled to the mobile structure to provide a 360 degree coverage around the mobile structure and the three-dimensional representation generated by the logic device comprises at least a representation of the 360 degree coverage around the mobile structure.

* * * * *